United States Patent [19]
Stoner

[11] 3,965,407
[45] June 22, 1976

[54] METHOD AND MEANS FOR MEASURING THE TORQUE DELIVERED BY AN ELECTRIC MOTOR

[75] Inventor: Thomas A. Stoner, Brookfield, Wis.

[73] Assignee: Bucyrus-Erie Company, South Milwaukee, Wis.

[22] Filed: Sept. 12, 1974

[21] Appl. No.: 505,529

Related U.S. Application Data

[62] Division of Ser. No. 332,697, Feb. 15, 1973, Pat. No. 3,867,678.

[52] U.S. Cl. .............................. 318/432; 318/434; 318/332
[51] Int. Cl.² ........................................... H02P 5/00
[58] Field of Search ............ 318/432, 433, 434, 332

[56] References Cited
UNITED STATES PATENTS

| | | | |
|---|---|---|---|
| 3,510,743 | 5/1970 | Mortimer | 318/432 X |
| 3,518,519 | 6/1970 | Callan | 318/332 X |
| 3,583,015 | 6/1971 | Eggert et al. | 318/432 X |
| 3,826,961 | 7/1974 | Hayase et al. | 318/332 X |

Primary Examiner—B. Dobeck
Attorney, Agent, or Firm—Quarles & Brady

[57] ABSTRACT

A torque feedback signal for the control system of a motor-generator set is generated by a torque feedback circuit which includes a differentiator and a current sensing circuit. The differentiator is connected to sense generator output voltage and provide an acceleration torque signal which is proportional to the first derivative of generator voltage. The current sensing circuit provides an induced torque signal proportional to motor armature current, and this is summed with the acceleration torque signal to provide a feedback signal proportional to the torque at the motor rotor. A second embodiment is shown which separates the induced torque into steady-state and transient components. The transient component is summed with the acceleration torque signal to provide a transient torque feedback signal, and the steady-state induced torque component is fed back to establish a torque limit.

3 Claims, 7 Drawing Figures

METHOD AND MEANS FOR MEASURING THE TORQUE DELIVERED BY AN ELECTRIC MOTOR

This is a division of application Ser. No. 332,697, filed Feb. 15, 1973, now U.S. Pat. No. 3,867,678.

BACKGROUND OF THE INVENTION

The general field of the invention is methods and means for measuring the force delivered to a load by an energy conversion machine, and more specifically, to means for indirectly measuring the torque delivered by an electric motor to a load.

A d-c electric motor is an energy conversion machine which receives electrical energy at its armature circuit and converts it to mechanical energy at its rotor by electromagnetic interaction of armature current with magnetic flux established by associated field windings. A torque is thereby induced into the rotor which causes it and the attached load to rotate. Commonly, when the motor is connected to a control system for governing rotation, rotor torque is sensed and a torque feedback signal is developed which is used by the control system to vary the amount of electrical energy supplied to the motor.

It is a fundamental principle of both servo systems and regulator control systems that the magnitude of such torque feedback signals be directly proportional to the torque delivered by the motor. Two approaches are presently used to generate a torque feedback signal for an electric motor, neither of which is entirely satisfactory. The first and most direct approach is to attach a sensing device, such as a strain gauge, directly to an element of the load. Although such a direct approach may provide an accurate indication of motor torque, the sensing apparatus commonly used are often expensive to install and maintain, particularly in applications where the sensing device is subject to severe environmental conditions.

The second, and the most common approach used to generate a torque feedback signal is to electrically sense a motor operating parameter which indirectly indicates motor torque. With d-c motors, for example, the magnitude of the motor's armature current is sensed and a torque feedback signal proportional thereto is generated. If the d-c motor has a commutating winding it is also common to sense the voltage drop across this winding for an indication of torque. Similarly, with a-c motors a torque feedback signal proportional to winding current squared can be used as an indication of the torque developed by the motor. Although prior indirect means of indicating motor torque are highly reliable and relatively inexpensive to implement and to maintain, they are not entirely satisfactory for all control purposes.

In drive systems such as that disclosed in U.S. Pat. No. 3,518,444 issued to D. E. Barber on June 30, 1970 and entitled "Control System for Excavating Equipment," the magnitude of the torque generated by a d-c hoist motor on an excavator is sensed by measuring the voltage generated across its commutating field winding. The torque feedback signal thus generated is proportional to the torque generated by the hoist motor. It has been discovered, however, that when such control systems operate as regulators to limit the torques and forces developed in the hoist drive mechanism of the excavator, the established torque limits are often exceeded during digging operations.

The excessive torques and forces which develop in excavators using prior control systems are transient in nature, and occur primarily when the dipper strikes large objects such as rocks during digging. Although they last for a relatively short period of time, such excessive transient torques and forces occur repeatedly and considerably shorten the useful life of various elements in the drive system.

Considerable effort has been made to reduce these high transient torques and forces which occur during digging and to thereby extend the useful life of the excavator front end and particularly the useful life of the hoist rope. Such past efforts have been directed primarily to means of shortening the response time of the control system. However, it has become increasingly apparent that regardless of the response time of the control system, these high transient torques and forces will continue to be generated as long as present torque sensing and measuring techniques are used. Thus, there is a need for better torque sensing and measuring techniques which will improve the response of controls to transient load conditions. Although such an improved system would find immediate application in the hoist motor drives of excavators, a control system providing such improved response would find application in a variety of drives.

SUMMARY OF THE INVENTION

The present invention relates generally to an improved method of indirectly measuring the force delivered to a mechanical system by an energy conversion machine. More specifically, it relates to an indirect method and means of generating a torque feedback signal which is proportional to the torque at the rotor of an electric motor. The invention stems from a discovery that the total load torque at the rotor of an electric motor is equal to the alegbraic sum of two component torques; an induced torque component related to the energy supplied to the motor, and an acceleration torque component related to the energy required to accelerate or decelerate the inertias of the motor rotor and attached drive system. The invention includes the steps of sensing the magnitude and sign of the acceleration torque component and generating a signal proportional thereto, sensing the induced torque component and generating a signal proportional thereto, and summing these two signals to obtain a signal proportional to the total load torque. The invention also includes a means of generating a torque feedback signal for a motor, which means includes a first sensor connected to sense motor armature current and generate an induced torque signal proportional to armature current; and a second sensor including a differentiator circuit connected to sense a voltage and generate in response thereto an acceleration torque signal proportional to the rate of change of the sensed voltage; and summing means connected to receive and arithmetically add the induced torque signal and the acceleration torque signal to obtain a rotor torque feedback signal.

It is a general object of the invention to provide an improved method and means of indirectly measuring the torque applied to a mechanical system by a motor. Prior torque measuring circuits for d-c motors, such as that disclosed in the above cited U.S. Pat. No. 3,518,444, sense armature current and therefore only indicate the magnitude of the induced torque component. The resulting feedback signal is therefore not an accurate indication of the torque actually present and applied at the load. The present invention, on the other hand senses the magnitude of the acceleration torque component and adds this quantity to the induced torque component to provide an accurate indication of the total torque delivered to the load.

Another object of the invention is to provide a means of generating a torque feedback signal to a control system which more accurately reflects the torque actually being delivered to the load. In certain applications, and in particular the hoist drive of large excavators, the combined inertias of the mechanical system and the motor rotor generate large acceleration and deceleration torques during rapid speed changes. These acceleration torques may alone exceed the torque limit which the control system is intended to establish. Therefore, by sensing the acceleration torque component and combining it with the sensed induced torque component, a torque feedback signal is generated which can more effectively control or regulate the torques and forces in the system.

Another object of the invention is to generate a torque feedback signal for a d-c motor. The induced torque component is indicated by sensing motor armature current. The acceleration torque component is indicated by sensing the rate of change of the voltage applied to the motor armature. This is accomplished by a differentiator circuit. When the two signals thus generated are summed, the resulting torque feedback signal contains the information necessary to effectively limit the torque applied to the load under all operating conditions.

Still another object of the invention is to provide an indirect torque indicating means for the hoist drive control system on an excavator. Due to the inherent time delays associated with large d-c motor drives, a particularly useful transient-torque feedback signal generator using the teachings of the present invention has been developed. When used in combination with a conventional induced torque feedback circuit, a net torque feedback signal is generated to the hoist drive control system which provides a substantial reduction in the magnitude of the transient torques occurring in the system.

The foregoing and other objects and advantages of the invention will appear from the following description. In the description reference is made to the accompanying drawings which form a part hereof, and in which there is shown by way of illustration preferred embodiments of the invention. Such embodiments do not necessarily represent the full scope of the invention, and reference is made to the claims herein for interpreting the breadth of the invention.

DESCRIPTION OF THE PREFERRED EMBODIMENTS

Figure 1:
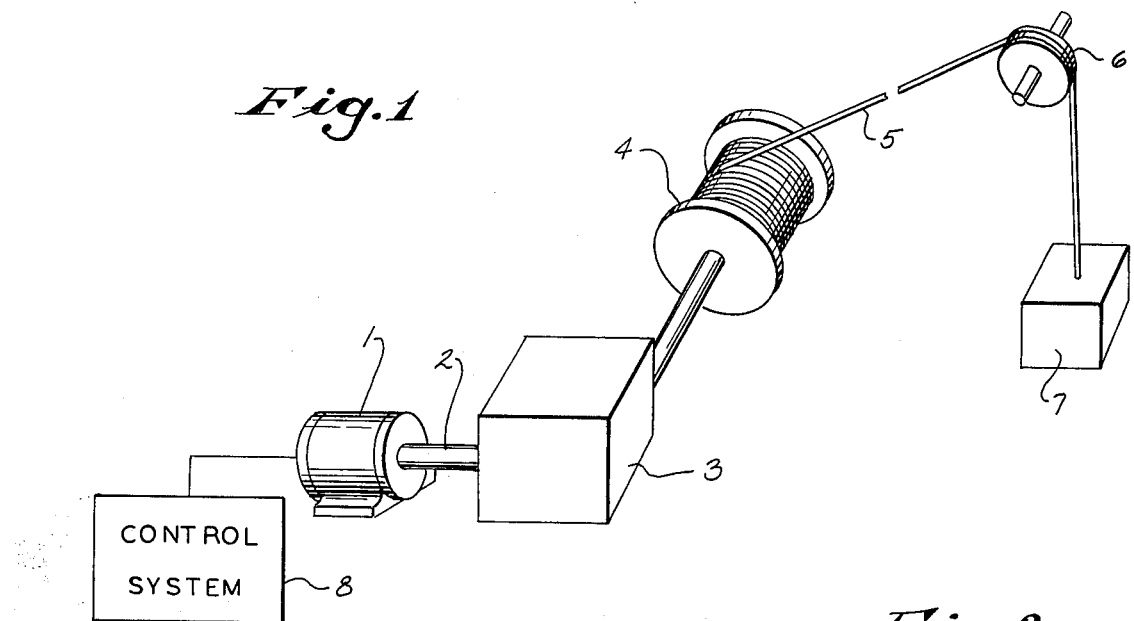
FIG. 1 is a schematic drawing of a motor drive system.

As indicated, the general object of the present invention is to measure, or indicate the force delivered to a load by an energy conversion machine. Referring to FIG. 1, such an energy conversion machine is shown as a motor 1. The rotor of the motor 1 is attached to drive a shaft 2 which connects through a transmission 3 to revolve a drum 4. The torque generated at the shaft 2 by the motor 1 is multiplied by the transmission 3, with an accompanying reduction in rotary speed. One end of a rope 5 is attached to the drum 4 and the other end extends over a sheave 6 to connect with a weight 7. The drum 4 acts to convert the torque generated by the motor 1 to a linear force or tension on the rope 5 which in turn acts to raise or lower the weight 7. It should be apparent to those skilled in the art that the drive system schematically shown in FIG. 1 is representative of any one of many drive systems in which an energy conversion machine is driving an attached load. For example, it may represent the hoist drive system of an excavator, in which the rope 5 is a hoist rope, the sheave 6 is a boom point sheave, and the item 7 is a dipper to which digging forces are applied when the dipper is hoisted upward through a bank of earth.

When used as a hoist drive on an excavator, the generalized system of FIG. 1 is attached to a control system 8, such as that disclosed in the above cited patent. The control system 8 operates to control the electrical energy supplied to the motor 1 and to thereby control the rate of rotation of the shaft 2 and the hoist rate of the dipper 7. The digging forces acting on the dipper 7 during hoisting cause abrupt variations in dipper velocity. These abrupt speed variations create inertia forces which act on the mechanical components of the drive system and are reflected back through the drum 4 and transmission 3. The motor 1 responds to the resulting variations in the torque at the shaft 2 to maintain the hoist rate demanded by the control system 8. To prevent overloading, however, a torque limit is established, and when this limit is sensed by the control system 8, motor speed is reduced and digging proceeds at a slower rate until the obstruction generating the high digging force is cleared. Thus to prevent excessive forces from being developed in the drive syste, and particularly in the rope 5, an accurate indication of the torque delivered by the motor 1 to the shaft 2 must be made and a corresponding torque feedback signal must be generated to the control system 8.

Prior control systems generate a torque feedback signal using indirect means of sensing torque at the shaft 2. The torque at the shaft 2 is an accurate indication of the torque applied to the gears in the transmission 3, the torque applied to the drum 4, and the tension on the rope 5 — at least under relatively steady state conditions in which changes in the load are not too abrupt. Thus, to limit the tension on the rope 5, for example, the control system 8 operates to reduce hoist speed when the torque feedback signal reaches a preset limit. In prior control systems for d-c machines the general approach used to measure the torque at the shaft 2 is based on the following relationship found in nearly every textbook on d-c machines.

$$T_1 = K_m I_a$$

where:

$T_i$ = induced torque
$K_m$ = motor torque constant
$I_a$ = motor armature current The induced torque $T_i$ is that created by electromagnetic interaction within the motor 1, and is measured by sensing motor armature current. The induced torque is the total torque that would exist for a steady state speed condition, and hence at times herein may be referred to as a steady state torque. Although this induced torque is equal to the torque at the shaft 2 under steady state speed conditions, it is not equal to, or even proportional to the torque on the shaft 2 during transient conditions. Consequently, a control system subject to abrupt transient conditions cannot successfully limit torque by sensing a limit on motor armature current.

It is a discovery of the present invention that the induced torque indicated in the above expression represents only one component of the total load torque delivered by an electric motor. This component is related to the amount of electrical energy supplied to the motor 1 and converted into mechanical energy. The above expression does not include the torque component which results from the acceleration, or deceleration of the inertias of the drive system. This latter torque component is referred to herein as an acceleration torque. For example, assume that the weight 7 in FIG. 1 is hoisted at a constant rate and suddenly encounters an immovable obstacle which brings it to a halt. The tension in the hoist rope 5 immediately rises, as does the torque at the shaft 2. In response to the excessive torque demand on the shaft 2, the control system 8 decreases the energy supplied to the motor 1 in an attempt to maintain the armature current and the induced torque at the shaft 2 under the preset limit. Nevertheless, it has been found that the total torque at the shaft 2, and therefore the tension on the rope 5, may surge well above the regulated maximum during transient conditions. The reason for this sharp rise can be attributed partially to the time delays in the control system 8. However, it is a teaching of the present invention that the inertias of the motor rotor, the shaft 2, the transmission 3, and the drum 4 also contribute substantially to the sharp rise in load torque and must be considered. Specifically, these elements are rotating rapidly during hoisting, and when the weight 7 is suddenly stopped by an immovable object, the inertias of these revolving elements generate increased tension on the rope 5, even though the control system 8 deenergizes the motor 1.

Figure 4A:
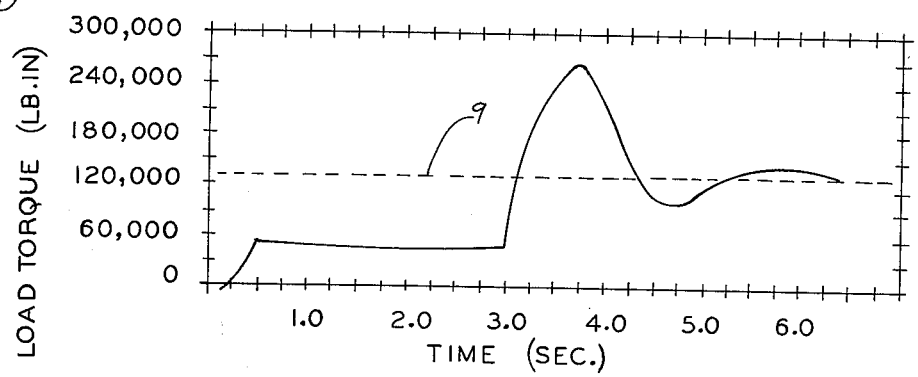
FIGS. 4a, 4b, and 4c are graphs showing the operating characteristics of prior hoist motor control systems.
Figure 4B:
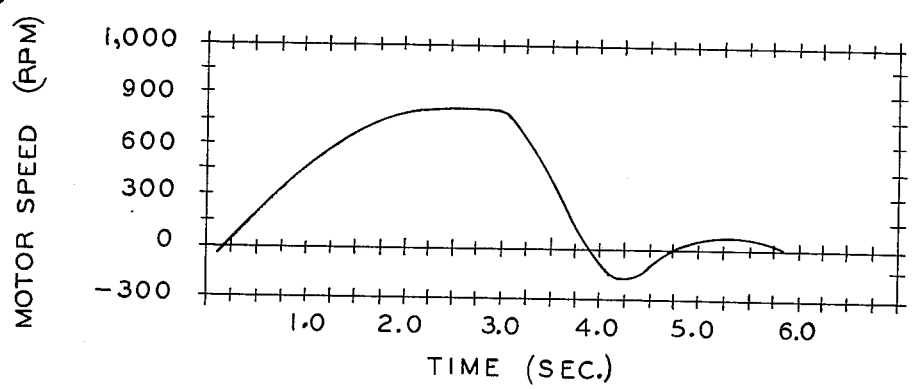
Figure 4C:
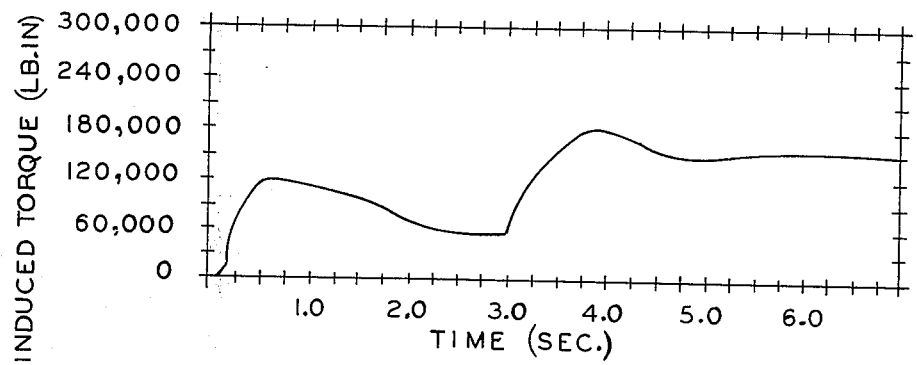

An indication of the problems encountered with prior art torque sensing and torque control systems is illustrated by the graphs in FIGS. 4a, 4b and 4c. When a control system such that disclosed in the above cited patent is applied to the hoist-lower control of a Bucyrus-Erie Model 280-B excavator, the tension on the hoist rope peaks at a value of nearly twice the regulated maximum when the dipper impacts against a relatively immovable object. The graph in FIG. 4a plots load torque as a function of time during a digging cycle in which the dipper strikes a large rock. The desired torque limit is indicated by the dashed line 9. During the initial portion of the cycle, torque is maintained at a relatively low and constant value, however, at $t=3$ seconds impact is made the load torque rises sharply to a value of approximately 266,000 pound-inches, or nearly twice the limit which the hoist control system is designed to establish. As indicated by the graph in FIG. 4b, which is a plot of hoist motor speed as a function of time, the speed of the hoist motor decelerates rapidly at impact. The load torque begins to rise shortly after impact and after peaking eventually reaches the steady-state torque limit established by the hoist control system. A plot of the induced torque component as a function of time is shown in FIG. 4c. It is immediately apparent from this graph that the hoist control system does, in fact, provide regulation of the induced torque component. Despite this, however, it does not provide adequate regulation of the total torque delivered to the load as evidenced by the graph in FIG. 4a.

The circuits which are now to be described form part of the control system 8 and constitute an improved means of sensing and indicating the actual torque delivered to the load. The torque feedback signals which these circuits generate operate the control system 8 to provide more effective control over the torques and forces which occur in the drive system elements. It will also become apparent that the improved means of sensing and indicating torque can be used independently of the control system 8 as a measuring device.

Figure 2:
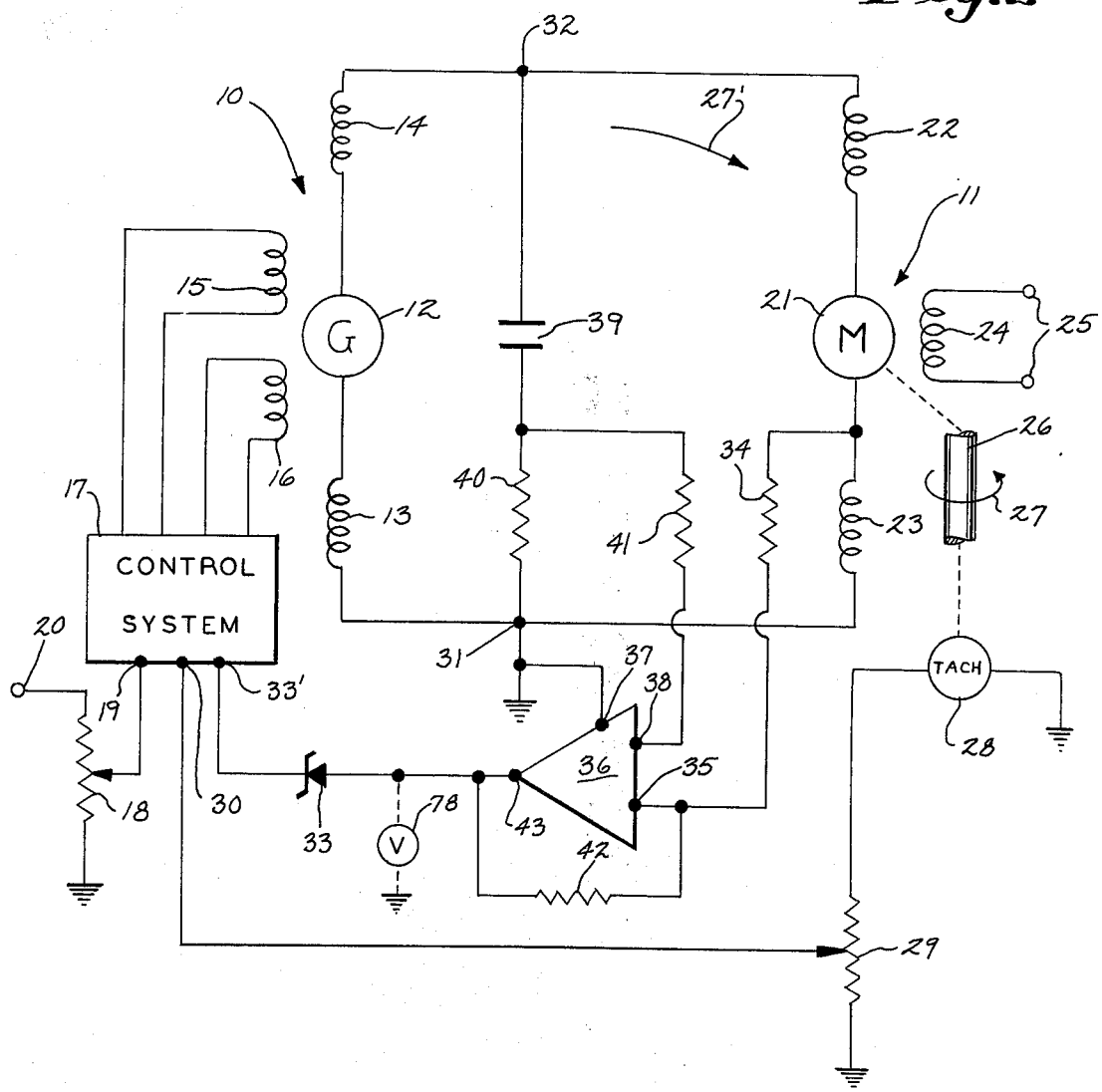
FIG. 2 is an electrical schematic diagram of a motor drive control system embodying the present invention.

Referring to FIG. 2, a d-c generator designated generally at 10 is connected in series with a d-c motor designated generally at 11 to form a closed armature circuit loop. The generator 10 includes an armature 12 connected in series with a commutating field winding 13 and a series field winding 14. The generator 10 also includes forward field winding 15 and reserve field winding 16 which are magnetically coupled to the generator armature 12, and which operate to induce a d-c voltage therein when supplied with direct current. The d-c motor 11 includes an armature 21 connected in series with a series field winding 22 and a commutating field winding 23. The motor 11 also includes a shunt field winding 24 connected to a pair of d-c voltage supply terminals 25. The motor 11 and generator 10 form a standard Ward-Leonard drive which is commercially available in many sizes and ratings. When armature current is supplied to the motor 11 by the generator 10, an induced torque is produced at the motor rotor and applied to a shaft 26. The direction of motor armature current in the loop is determined by current flow in the generator field windings 15 and 16, and this direction in turn determines the direction of the induced torque at the shaft 26. For purposes of illustration, when current flows in the generator forward field winding 15, loop current flows in the direction indicated by the arrow 27', and the shaft 26 is driven in a forward direction which is indicated by an arrow 27.

The forward field winding 15 and reverse field winding 16 on the generator 10 are connected to the outputs of a control system 17. The control system 17 operates to generate a current through either the forward field winding 15 causing a current to flow in one direction in the motor-generator loop, or to generate a current to the reverse field winding 16 causing a current to flow in the opposite direction in the motor-generator loop. The magnitude of the field current is determined in part by the setting of a reference potentiometer 18, the slider of which connects to an input terminal 19 on the control system 17. One lead of the reference potentiometer 18 is connected to signal ground, and the other lead connects to a d-c voltage supply terminal 20.

The speed of the motor 11 is sensed by a tachometer 28 which is attached to the shaft 26 and rotated thereby. One lead of the tachometer 28 is connected to signal ground, and another lead connects to signal ground through a potemtiometer 29. A slider on the potentiometer 29 connects to an input terminal 30 of the control system 17. The tachometer 28 generates a speed feedback signal which is proportional in amplitude to the speed of the motor 11. Polarity of the signal indicates the direction of rotation.

The operation of the servo system thus formed is well known to those skilled in the art. A command signal is generated by the reference potentiometer 18 and is summed in the control system 17 with the speed feedback signal generated by the tachometer 28 to provide an error signal. The polarity of this error signal determines which of the field windings 15 or 16 is energized, and the magnitude of the error signal determines the magnitude of the current flowing in the energized field winding. Thus by selecting the polarity of the d-c voltage applied to the supply terminal 20 and by selecting the setting of the reference potentiometer 18, the machinery operator can control the direction and operating speed of the motor 11. Numerous variations can be made to the system thus far described. For example, instead of using a tachometer to sense motor speed, the voltage across the motor armature 21 and the winding 22 can be sensed, as is done in the aforesaid cited patent. This voltage provides an indirect indication of motor rotor speed, and can therefore be used as a speed feedback signal for the control system 17.

A torque sensing and indicating circuit incorporating the present invention is attached to the servo drive system described above. This circuit operates to generate a torque feedback signal through a zener diode 33 which is connected to an input terminal 33' on the control system 17. The torque sensing and indicating circuit includes a motor armature current sensor which is comprised in part of a first coupling resistor 34. The first coupling resistor 34 has one lead connected to the junction between the motor commutating field winding 23 and the motor armature 21, and its other lead connects to an inverting input terminal 35 and an operational amplifier 36. The operational amplifier 36 has a common terminal 37 which connects to both signal ground and to the generator output terminal 31. Consequently, the voltage established across the motor commutating field winding 23 generates a current through the first coupling resistor 34 to the amplifier inverting input terminal 35. This current is proportional to the motor armature current and is, therefore, proportional to the induced torque component at the shaft 26.

The torque sensing and indicating circuit also includes a differentiator circuit which connects across the generator output terminals 31 and 32. The differentiator circuit includes a capacitor 39 having one lead connected to the generator output terminal 32 and another lead connected through a differentiator resistor 40 to generator output terminal 31. The other lead on capacitor 39 also connects through a second coupling resistor 41 to a noninverting input terminal 38 on the operational amplifier 36. The differentiator circuit operates to sense the voltage applied to the motor armature circuit and to generate a current to the noninverting input terminal 38 which is proportional to the derivative, or rate of change of that voltage. This signal is proportional to the acceleration torque component at the shaft 26 and is termed herein an "acceleration torque signal".

The operational amplifier 36 functions to sum the induced torque signal received at its inverting input terminal 35 and the acceleration torque signal received at its noninverting input terminal 38. It includes a feedback resistor 42 connected between the operational amplifier output terminal 43 and its inverting input terminal 35. The value of the feedback resistor 42 is chosen in conjunction with the values of the first and second coupling resistors 34 and 41 to adjust the gain of the summing circuit. The voltage at the operational amplifier output terminal 43 is proportional to the sum of the induced torque signal and the acceleration torque signal, and it constitutes the torque feedback signal which is conveyed through the zener diode 33 to the control system 17.

When the motor 11 is operating in the forward direction, current flows in the motor-generator loop in the direction indicated by the arrow 27; as hereinbefore indicated. Under steady state conditions a voltage is thus established across the motor commutating field winding 23 which causes a positive current flow into the inverting input terminal 35 of the operational amplifier 36. As a result, the output terminal 43 is driven to a negative voltage. When the load torque demand on the motor 11 becomes excessive (as may occur when motor speed falls because of an increasing load and the output signal of the tachometer 28 decreases to cause an increased error signal in the control system 17 calling for increased motor speed) then the negative voltage at the terminal 43 reaches the breakdown, or threshold voltage of the zener diode 33, and a negative current is generated to the control system input terminal 33'. This negative current operates to reduce the net error signal generated by the control system 17 and thereby reduce the current flow in the forward field winding 15. As a result, both the generator output voltage and motor armature current decrease to slow the speed of the motor 21 and reduce the torque demand. The threshold nature of the zener diode 33 provides the desired upper limit on the torque output of the motor 21.

When sudden, or abrupt transient speed changes occur, the differentiator circuit comes into play. Specifically, when the motor 11 is decelerated upon encountering a suddenly imposed large load, the voltage across the generator output terminals 31 and 32 drops. A negative current proportional in magnitude to the rate of change of this voltage drop is generated by the differentiator circuit and fed to the amplifier noninverting input terminal 38. This negative current represents an increase in the total torque at the shaft 26 and is proportional to the acceleration torque produced during the sudden speed change. It is added to the negative current generated at the amplifier output terminal 43 which is attributable to the induced torque component, and it operates to further reduce the net error signal generated by the control system 17. A further reduction in the electrical energy supplied to the motor armature 21 results. In fact, when large decelerations occur, the magnitude of the acceleration torque component may be large enough to reverse the polarity of the net error signal generated by the control system 17. When this occurs the functions of the generator 10 and motor 11 reverse. That is, the motor 11 begins to generate electrical power to the generator 10. The energy thus transferred is derived from the kinetic energy of the driven mechanical system and it is one of the advantages of the present invention that the control system 17 is operated by the torque sensing circuit to dissipate this energy as electrical energy in the Ward-Leonard drive rather than allowing it to be dissipated as heat in the stretching of ropes or straining of shafts and gears in the driven mechanical system.

As the above discussion indicates, the torque feedback circuit of FIG. 2 generates a torque feedback signal which is comprised of two components: an acceleration torque signal generated by the differentiator circuit; and an induced torque signal generated by the armature current sensing circuit. The resulting torque feedback signal at the output terminal 43 of the operational amplifier 36 is a true indication of the total torque on the shaft 26 during both steady-state and transient speed conditions. In fact, a voltmeter indicated at 78 may be connected at the amplifier output 43 to provide a visual indication of load torque.

Figure 3:
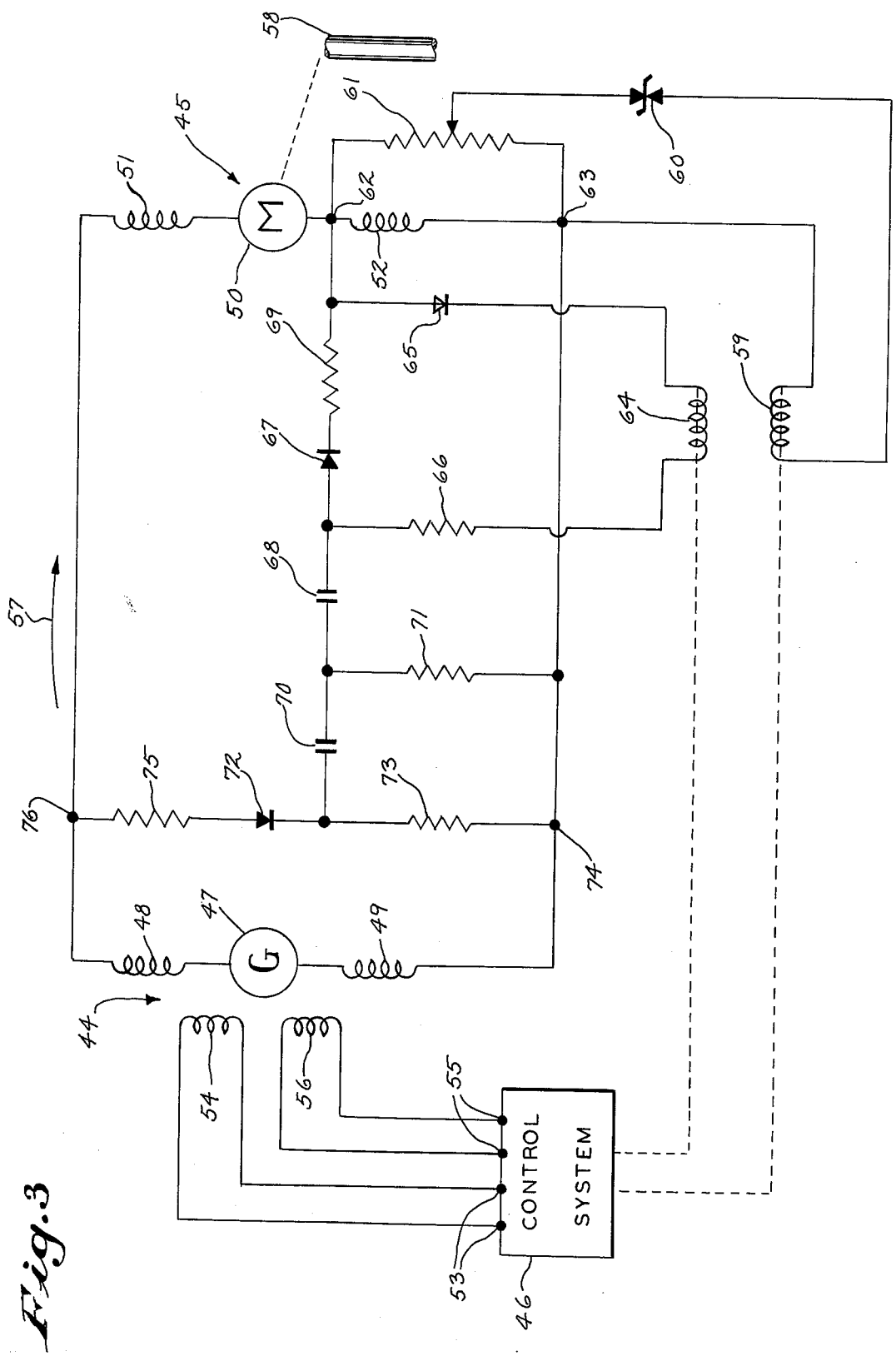
FIG. 3 is an electrical schematic diagram of a motor drive control system which includes an alternative embodiment of the present invention.

A particularly useful application of the present invention to the hoist drive system of a large excavator is shown in FIG. 3, but in this embodiment of the invention the total torque feedback signal is comprised of components which when summed together are not necessarily proportional to total load torque. Instead, this circuit generates two torque components: a steady-state induced torque signal which is proportional to the average induced torque delivered to the load; and a transient torque signal, which is representative of the fluctuations in the total load torque. The total torque feedback generated by this second embodiment of the invention is, therefore, comprised of a transient torque feedback signal and a steady-state torque feedback signal and the magnitude of the transient torque feedback signal can be adjusted independently of the magnitude of the steady-state torque feedback signal with the result that the reaction of the hoist drive control system to transient loading can be substantially improved.

Referring to FIG. 3, the hoist drive system includes a motor generator set comprised of a generator 44, a motor 45, and a control system 46. The hoist drive system may be applied, for example, to a Bucyrus-Erie Company Model 280-B excavator, in which the ratings of the generator 44 and motor 45 are as follows:
General Electric Generator
Model No. CDS 6482
641 KW at 1800 RPM — 475 volts
General Electric Motor
Model No. MDP 620
750 Hp. at 720 RPM — 460 volts The generator 44 includes an armature 47, a series field winding 48 and a commutating field winding 49 connected to form a closed loop with a motor armature 50, its series field winding 51 and its commutating field winding 52. The control system 46 has a first pair of output terminals 53 which connect with a forward field winding 54 on the generator 44, and a second pair of output terminals 55 which connect with a reverse field winding 56 on the generator 44. When the control system 46 generates a current through the forward field winding 54, a current is generated in the motor-generator loop in the direction indicated by the arrow 57. The resulting torque produced by the hoist motor 45 is coupled to a shaft 58 which rotates to hoist or lift the excavator dipper through a mechanical drive system that is not shown.

The control system 46 is similar to that disclosed in the above cited U.S. Pat. No. 3,518,444, and it includes a magnetic amplifier, or saturable reactor (not shown in the drawings). The saturable reactor includes control windings that generate feedback signals in the control system, which feedback signals are summed magnetically to provide an error signal for controlling generator field current at either of the output terminals 53 or 55.

One saturable reactor control winding of the control system 46 is indicated in FIG. 3 by the reference numeral 59 and is connected to the motor armature circuit to receive a steady-state induced torque feedback signal. One lead of the control winding 59 connects through a zener diode 60 to the slider of a torque limit potentiometer 61, the resistance element of which is connected across the motor commutating field winding 52 at the terminals 62 and 63. The other lead of the control winding 59 also connects to the terminal 63, which is hereinafter referred to as the reference terminal 63. The steady-state induced torque feedback circuit thus established generates a current in the control winding 59 which is proportional to the voltage across the commutating field winding 52, and therefore, proportional to the motor armature current. The setting of the torque limit potentiometer 61 and the reverse breakdown voltage of the zener diode 60 determines the upper limit on torque which the control system 46 is to establish. That is, when the steady-state induced torque at the shaft 58 equals or exceeds this upper limit, the positive voltage generated at the slider of the torque limit potentiometer 61 exceeds the breakdown voltage of the zener diode 60 and current flows through the control winding 59 causing the control system 46 to reduce the current flowing in the generator forward field winding 54. Motor armature current is thus reduced and the induced torque at the shaft 58 drops. This portion of the circuit of FIG. 3 is similar to the load current indicating subcircuit described in the above cited patent.

A second control winding 64 is also coupled to the control system 46 and is operable to generate a transient torque feedback signal thereto. One lead of the second control winding 64 connects to the cathode of a first coupling diode 65, the anode of which connects to the terminal 62 on the motor commutating field winding 52. The other lead of the second control winding 64 connects through a first coupling resistor 66 to the anode of a second diode 67 and to one lead of a coupling capacitor 68. The cathode of a second diode 67 connects through a second coupling resistor 69 to the terminal 62 on the motor commutating field winding 52. The other lead of the coupling capacitor 68 connects to one lead of a differentiator capacitor 70 and through a differentiator resistor 71 to the reference terminal 63. The other lead of the differentiator capacitor 70 connects to the cathode of a third diode 72 and through a first voltage divider resistor 73 to a first generator output terminal 74. The generator output terminal 74 connects directly to the reference terminal 63. The anode of the third diode 72 connects through a second voltage divider resistor 75 to a second generator output terminal 76.

The second control winding 64 generates a transient torque feedback signal to the control system 46. The transient torque feedback signal includes a first component which is generated by a differentiator circuit comprised of the differentiator capacitor 70, the differentiator resistor 71, and the voltage divider network formed by first and second voltage divider resistors 73 and 75. This first component is proportional to the acceleration torque at the shaft 58 and it appears as a voltage across the differentiator resistor 71. It is summed with a second torque component which is derived from the voltage drop across the motor field winding 52, and the two components are capacitively coupled to the second control winding 64 through coupling capacitor 68 and first coupling resistor 66. Under steady state conditions when load torque is constant, no transient torque feedback signal is generated. However, when a sharp rise in torque occurs, the first coupling capacitor 68 provides a low impedance path through which large currents flow to the control winding 64. As a result, a large transient torque feedback signal is applied to the control system 46 to reduce the power applied to the motor 45.

The first and second coupling diodes 65 and 67 allow current flow in only one direction through the control winding 64. The transient torque feedback signal is, therefore, generated only while the shaft 58 is being driven in one direction by the motor-generator set. The orientations of the coupling diodes 65 and 67 are such that the transient torque feedback signal is effective to limit torque output only during the excavator hoist motion. As a result, the circuit is effective to limit the high transient torques which are encountered during digging, but does not inhibit the torque generated when the dipper is being lowered. Since the transient torque feedback circuitry operates independently of the steady-state torque circuitry, its gain can be set independently without affecting the steady-state torque limit established by the setting on the torque limit potentiometer 61. Thus the response time of the control system 46 to sudden changes in load torque can be improved without altering the torque limit.

Figure 5:
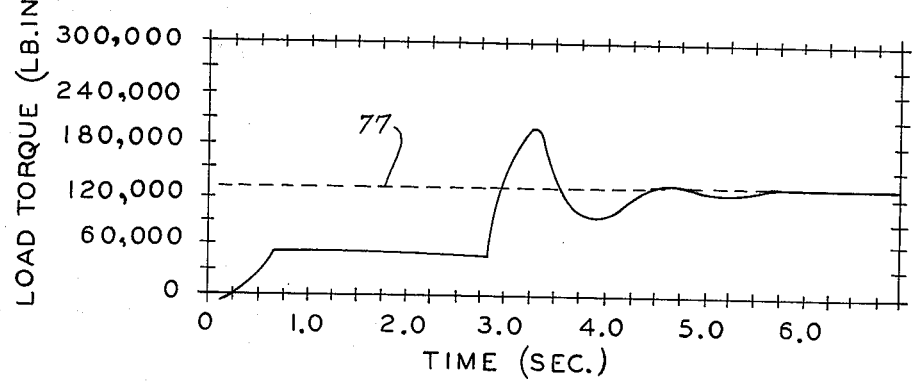
FIG. 5 is a graph showing the operating characteristics of a hoist motor control system which employs the circuit of FIG. 3.

Referring to FIG. 5, the total torque delivered by the motor 45 to the shaft 58 is shown plotted as a function of time. The dashed line 77 indicates the torque limit which is established by adjusting the slider on the torque limit potentiometer 61. It is set to the same value indicated by the dashed line 9 in FIG. 4a. The curve represents the torque on the shaft 58 as the excavator dipper is hoisted in a dig motion. At approximately t=3 seconds, the dipper impacts a relatively immovable object and a sharp rise in load torque occurs. Although the load torque rises above the limit established by the steady-state torque feedback circuit, the load torque quickly drops to acceptable levels. The effects of the invented circuit of FIG. 3 are apparent when a comparison is made between the peak load torque indicated by the curve in FIG. 5 and the peak load torque indicated by the curve in FIG. 4a. Whereas the peak load torque in the control system without the circuit of FIG. 3 reaches a value which is nearly twice that of the desired maximum, the peak load torque which occurs when the invented circuit is used reaches a value of only 1.49 times the maximum load torque. This constitutes a substantial reduction in the torque at the shaft 58 and a reduction in the resulting forces which are applied to the mechanical drive system.

In each of the embodiments described a voltage signal derived from the motor driving a load is differentiated to arrive at a signal indicative of rate of change in motor speed. This signal is then utilized as an indication of a torque component due to acceleration or deceleration of parts of the system. This torque component may be summed with additional torque signal components, particularly that indicating the electromagnetically induced torque applied by the motor. Prior control systems have relied solely on an indication of this induced torque when it is desired to utilize a torque feedback signal for control. The present invention teaches measurement of the additional acceleration torque component. This measurement may be made at the motor by indirect means, and is indicative of transient torques in the associated mechanical system. Hence, there is provided a control over torques, or forces, in a mechanical system by observation of drive motor operation.

I claim:

1. In a motor control, the combination comprising:
   means providing an electrical signal indicative of the speed of a motor being controlled;
   a differentiating circuit in receiving relation to said speed indicative signal that generates a signal indicative of rate of change of speed to provide an acceleration torque signal;
   a motor current sensing circuit that generates a signal indicative of induced torque of a motor being controlled;
   means for coupling said motor current sensing circuit to said differentiating circuit to sum said acceleration torque signal and said induced torque signal;
   a control circuit system for governing motor rotation; and
   means capacitively coupling said summed signals to said control circuit system for providing a transient torque feedback signal thereto.

2. In an excavator drive system which is subject to transient loading during digging, said drive system having a d-c motor fed by a d-c generator with the armatures of the generator and motor joined in an armature circuit loop, the combination comprising:
   a control circuit;
   a differentiator having a reactive component and a resistance component for connection across a voltage of the armature circuit loop to develop a signal indicative of acceleration torque;
   a current indicating circuit for connection across a part of the armature circuit loop to develop a signal indicative of motor induced torque; and
   circuit connections feeding the acceleration torque signal and induced torque signal to said control circuit.

3. In a speed control system for a d-c motor fed by a d-c generator with the armatures of the generator and motor connected in an armature circuit loop, and a speed control circuit feeding field windings of the generator with an adjustment for setting a reference signal, the combination therewith of:
   a differentiator circuit having reactive and resistive components connected across a voltage of said armature circuit loop to generate a signal indicative of the first differential of the voltage;
   a current indicating circuit connected across a part of the armature circuit loop to develop a signal indicative of motor armature current;
   a summing component that combines said signals; and
   a threshold current limiting element interposed between said summing component and said speed control circuit.

\* \* \* \* \*